Figure 1:
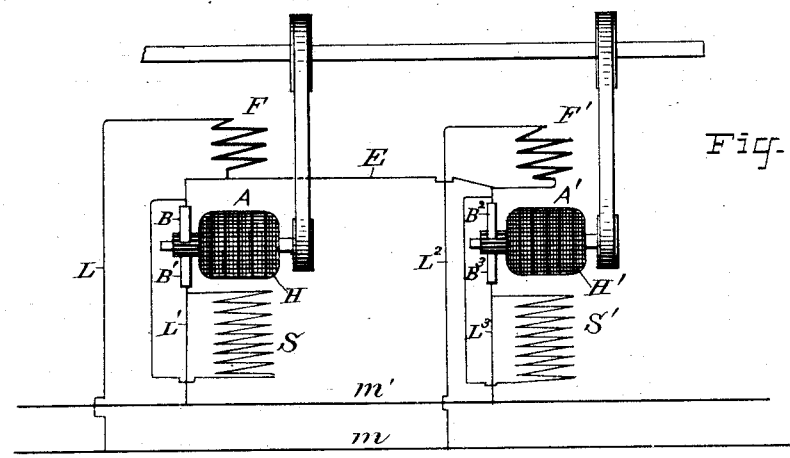

(No Model.)  2 Sheets—Sheet 1.

E. W. RICE, Jr.
COUPLING ELECTRIC MOTORS.

No. 422,975.  Patented Mar. 11, 1890.

ATTEST:
J. H. Hundly
Hr. H. Capel

INVENTOR:
Edwin Wilbur Rice Jr.
By H. L. Townsend
Attorney (No Model.) 2 Sheets—Sheet 2.

E. W. RICE, Jr.
COUPLING ELECTRIC MOTORS.

No. 422,975. Patented Mar. 11, 1890.

ATTEST:

INVENTOR:
Edwin Wilbur Rice Jr.

By H. L. Townsend
Attorney

UNITED STATES PATENT OFFICE.

EDWIN WILBUR RICE, JR., OF LYNN, MASSACHUSETTS.

COUPLING ELECTRIC MOTORS.

SPECIFICATION forming part of Letters Patent No. 422,975, dated March 11, 1890.

Original application filed May 7, 1888, Serial No. 273,156. Divided and this application filed October 14, 1889. Serial No. 327,244.

(No model.)

*To all whom it may concern:*

Be it known that I, EDWIN WILBUR RICE, Jr., a citizen of the United States, and a resident of Lynn, in the county of Essex and State of Massachusetts, have invented certain new and useful Electric Motors, of which the following is a specification.

My present invention relates to electric motors; and its purpose is to permit two or more motors to be applied to the same work—as, for instance, by gearing or belting to the same shafting—and at the same time to cause the load to be divided in proper proportion between them.

It is found in practice that if electric motors as ordinarily constructed and connected in circuit are belted or otherwise geared or connected to the same shaft, or are otherwise applied to the same work so that they must revolve together, the results obtained are unsatisfactory, because of the fact that the work or load will be unequally or disproportionately divided. This is occasioned by the fact that it is very difficult—in fact almost impossible—to construct electric motors so that they will, with the same rate of rotation and when supplied with current at the same potential, have precisely the same counter electro-motive force. Therefore if two motors are connected, as ordinarily, to the same supplying-mains, and operated so that they must revolve together, that motor whose armature produces the lowest counter electro-motive force will take a larger current than the other motor. The effect of this increased flow of current is, with many forms of motors, to greatly enhance or exaggerate the differences existing between the motors, because the magnetic field of the motor is disturbed by the increased flow, and its counter electro-motive force is thereby still further reduced. This motor, requiring a higher speed to produce a counter electro-motive force equal to that of the second motor, takes the bulk of the work and tends to drive the second motor as a generator. Thus that motor having the lowest counter electro-motive force has always the bulk of the work and the load is unequally divided between the different motors.

The object of my invention is to cause two motors connected to the same shaft to automatically regulate themselves so that there shall be at all times a proportionate distribution of the load between them.

To this end my invention consists in the combination, with each of the two or more motors, of an opposing field-magnet coil, or a coil which tends to cut down the efficiency of the field, said coil being connected to points in the circuits of the other motors where the potential varies with the counter electro-motive force of the same. For this purpose the coil may be connected to the circuit of the other motor at a point where the potential will vary with the counter electro-motive force, and such coil may conveniently be a series field-coil of the machine, in which case it determines or governs the flow of current to the motor by acting on the field thereof, its action being such as to primarily decrease the action of the fields, so that the counter electro-motive force of the armature in such field shall fall when the counter electro-motive force of the other motor falls.

My invention consists, also, in improved and special combinations and connections of apparatus for effecting the objects of my invention, which will be more specifically stated in the claims.

Figure 2:
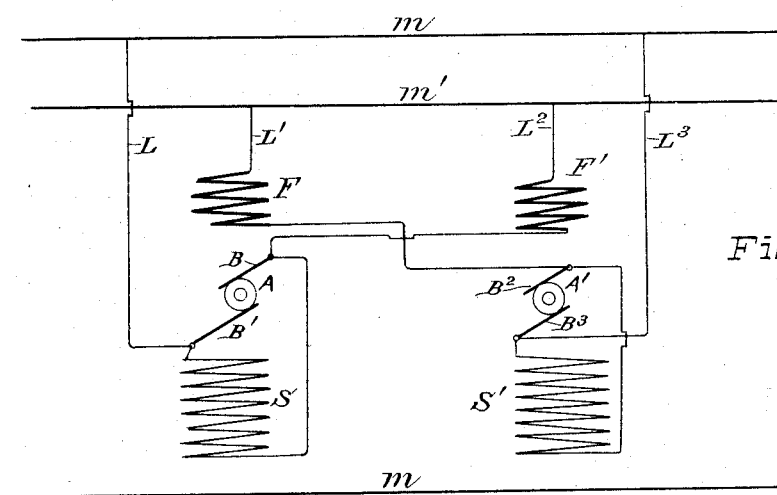
Figure 3:
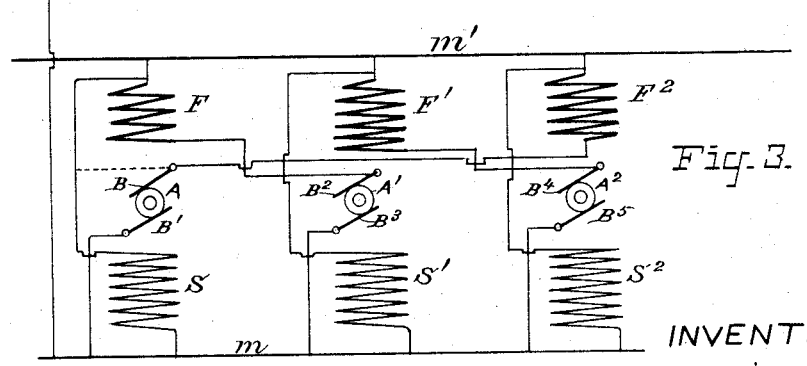
Figure 4:
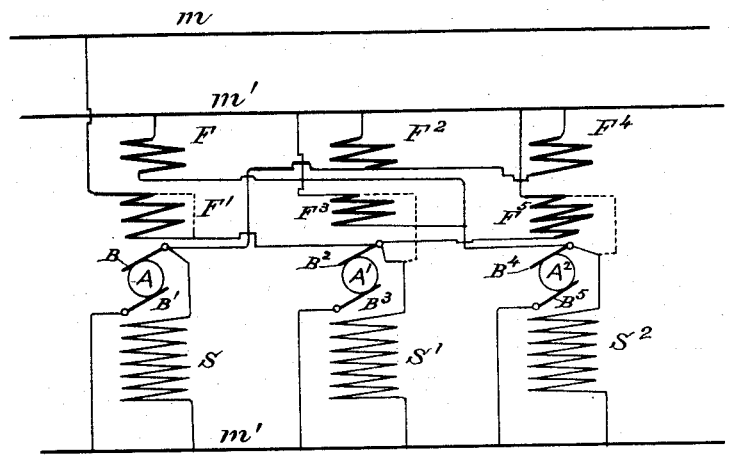
Figure 5:
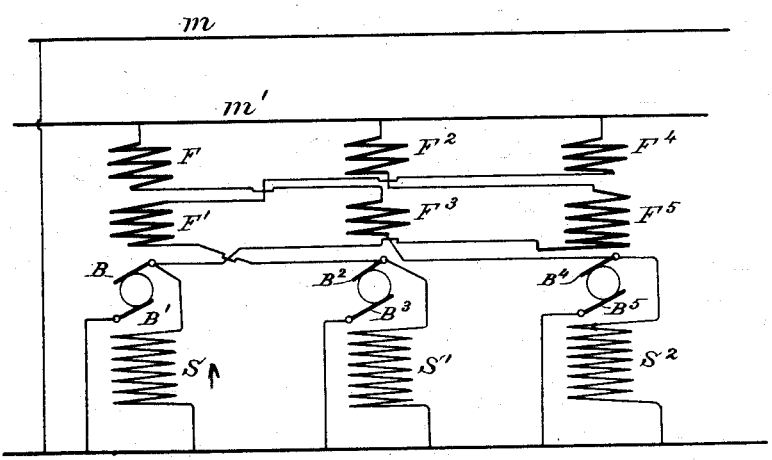

In the drawings, Figure 1 shows two motors with their pulleys belted to a single line of shafting connected in circuit according to my invention. Fig. 2 shows a modification of the connections in Fig. 1. Fig. 3 shows how three motors may be connected in circuit belted to a single line of shafting in accordance with my invention. Fig. 4 is a modification of the connections, Fig. 3. Fig. 5 is still a further modification.

Referring to Fig. 1, A and A' are two compound-wound motors adapted to be connected in a circuit of constant potential, H H indicate their armatures, F' F' represent the series windings which normally tend to cut down the magnetism due to the field-sustaining shunt-windings S S' of the two motors, respectively, and B B' B² B³ their commutator-brushes. L L' L² L³ show their connections to the constant potential circuit $m\ m'$. E indicates a connection, preferably of as low resistance as practicable, between the series winding of each motor A A' and a point where the potential varies with the counter electromotive force of the other.

The operation is as follows: Supposing that the motor A is the one having the lowest counter electro-motive force at a given speed, more current would tend to flow through its armature and the potential at the brush B would be lowered. This point of low potential, it will be seen, is fed from two sources—one through its own series field F and the other through the series field F' of the motor A and the connection E. The resistance of the connection E being very low, the increase of current to the point B is divided between the fields F F' in very nearly equal amount. The tendency to diminution in the counter electro-motive force of the motor A is therefore counteracted or compensated in two ways—first, only half the increase of current flows through its own series coil F, and, secondly and principally, the other half of the increase of current flows through the series coil F' of the motor A', and reduces its field, and hence its counter electro-motive force, in the same proportion that it is reduced in the motor A. In the same manner the point of lowered potential in the series circuit of the motor A' is fed partly through its own field F' and partly through the field F of the motor A. Thus any increase or decrease of potential in one motor is followed by a corresponding increase or decrease in the other motor, the counter electro-motive force of the motor A governing the flow of current in the series winding of the motor A', and hence determining the flow of current to the said motor, and the counter electro-motive force of the motor A' governing the flow of current in the series winding of the motor A, and hence determining the flow of current to the same.

Fig. 2 shows a modification in the connections. In this case the armature of the motor A takes its supply of current entirely through the series winding F' of the motor A', and the armature of the motor A' takes its current through the series winding F of the motor A. This is a preferable arrangement to that shown in Fig. 1, since the variation in current-flow, as determined by the counter electro-motive force of one motor-armature, acts wholly, as will be seen, to produce a corresponding and compensating variation in the strength of the magnetic field of the other motor-armature. The other characters of reference indicate parts corresponding to those in Fig. 1.

Fig. 3 shows an extension of the connections, Fig. 2, to three motors belted or otherwise connected to a single shaft. Similar letters refer to the same parts as in the preceding figures. Here the armature of the motor A controls field $F^2$ of motor $A^2$, armature of motor A' controls the field F of motor A, and armature of motor $A^2$ controls the field F' of motor A'.

Fig. 4 is a modification of the connections shown in Fig. 2, in which each motor has two series field-windings. In this case armature of motor A controls fields $F^2$ of armature A' and $F^4$ of armature $A^2$, armature of motor A' controls fields F' of armature A and $F^5$ of armature $A^2$, and armature of motor $A^2$ controls fields F of armature A and $F^3$ of armature A'—that is to say, one brush of each armature is the terminal of a multiple connection through series fields of the other two motors.

Fig. 5 is still another modification in the manner of connecting three motors, in which each armature is connected with a series coil on each of the other two motors; but said series coils, instead of being arranged in multiple, are arranged in series with one another.

It is of course understood that the number of motors to be belted or connected to a single shaft, or otherwise arranged to revolve together while operating upon the same work, may be increased to any extent desired by extending the connections, as indicated.

The method of producing a uniform distribution of the load between two or more electric motors applied to the same work, consisting in making the magnetic field of each dependent upon the counter electro-motive force of the other or others, is not herein claimed, as it forms the subject of an application for patent filed by me May 7, 1888, Serial No. 273,156, of which the present case is a division.

What I claim as my invention is—

1. In a system of power-distribution, two or more compound-wound electric motors simultaneously in use on the same work and each having its series field-magnet coil connected with a point in the circuit to an armature of another, where the potential varies with changes in the counter electro-motive force or resistance.

2. The combination, substantially as described, of two electric motors revolving together while operating upon the same work, and each having a current-determining coil placed in a circuit independent of the coil for the other, and connected with a point in the circuit of the other whose potential varies with the counter electro-motive force of its armature.

3. The combination, substantially as described, of two electric motors revolving together while operating upon the same work, and each having a field-determining coil connected at one terminal to a constant potential main and at its other terminal to a point in a branch from the main where the potential varies with the counter electro-motive force of the other motor.

4. The combination of two or more electric motors connected to the same work, and each having a series field-magnet coil provided with a connection to the main through the armature or armatures of the other.

5. The combination, with each of two or more electric motors applied to the same work, of a coil which tends to cut down the field efficiency, and connections from such coil to a point on a branch from a main where the potential varies with the counter electro-motive force of the other motor or motors.

6. The combination, with two or more electric motors, each having a derived-circuit field-sustaining coil and opposing coils, of connections from the latter coils on each motor to points in the armature-circuits where the potential due to counter electro-motive force of the other or others varies.

7. The combination, substantially as described, with electric motors applied to the same work and having field-sustaining coils in derivation to their armatures, of opposing field-magnet coils for each of said motors in connections from constant potential mains to the armature of another motor or motors.

8. The combination, with two electric motors applied to the same work and having their field-magnets provided with coils of substantially constant influence—such as derived-circuit coils—of an opposing field-magnet coil for each motor, and an armature for each motor fed from the main through the opposing coil of the other.

Signed at Lynn, in the county of Essex and State of Massachusetts, this 12th day of October, A. D. 1889.

EDWIN WILBUR RICE, Jr.

Witnesses:
J. WESLEY GIBBONEY,
A. L. ROHRER.